No. 787,012. PATENTED APR. 11, 1905.
W. A. TURBAYNE.
SYSTEM OF ELECTRICAL DISTRIBUTION.
APPLICATION FILED JUNE 24, 1904.
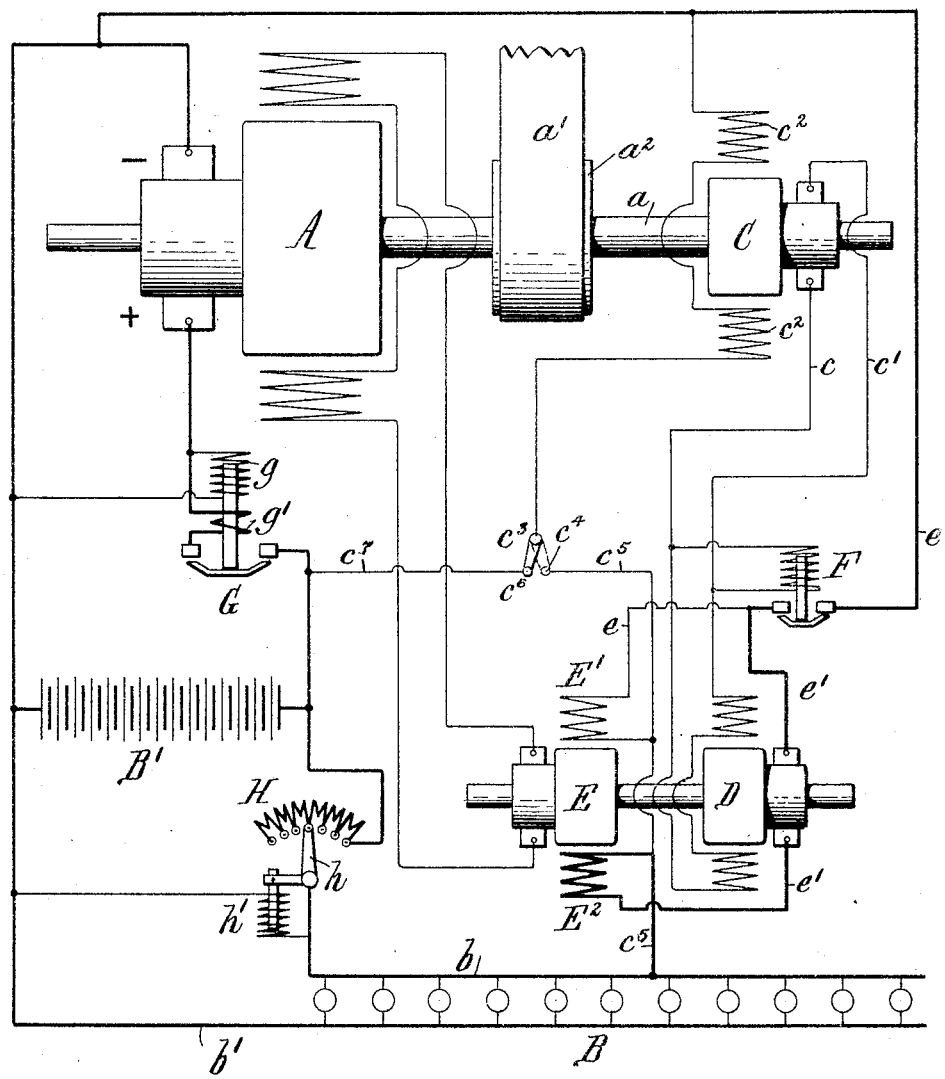

No. 787,012.                                    Patented April 11, 1905.

UNITED STATES PATENT OFFICE.

WILLIAM A. TURBAYNE, OF LANCASTER, NEW YORK, ASSIGNOR TO GOULD COUPLER COMPANY, OF NEW YORK, N. Y.

SYSTEM OF ELECTRICAL DISTRIBUTION.

SPECIFICATION forming part of Letters Patent No. 787,012, dated April 11, 1905.

Application filed June 24, 1904. Serial No. 213,933.

*To all whom it may concern:*

Be it known that I, WILLIAM A. TURBAYNE, a citizen of the United States, residing at Lancaster, in the county of Erie and State of New York, have invented a new and useful Improvement in Systems of Electrical Distribution, of which the following is a specification.

This invention relates to electric-lighting systems in which the generating-dynamo is subject to wide variations of speed and is liable to have its direction of rotation reversed—as, for instance, in railway-car-lighting systems in which the dynamo is driven from one of the car-axles. Letters Patent No. 757,695, granted to me April 19, 1904, discloses such a system, which is provided with automatic regulating means for generating a substantially constant current irrespective of the speed with which the dynamo-armature is driven and for delivering the current always in the same direction in whatever direction the armature of the dynamo may be rotated. In said patented system the field-magnet of the main or generating dynamo is excited by an exciter-dynamo which is driven with variable speed and inversely to the speed of the generator-dynamo by a motor whose field-magnet is energized from an auxiliary dynamo the armature of which is subject to the same changes in speed and direction of rotation as the armature of the generating-dynamo, while the field-magnets of the exciter-dynamo and the auxiliary dynamo and the armature of the motor are excited from one or more practically-constant sources. In this system the speed of the exciter-dynamo and the current delivered by the same to the field of the generating-dynamo becomes greater or less in practically the same ratio as the speed of the generating-dynamo falls or rises, whereby a practically-constant current is secured from the main or generating dynamo. A storage battery is employed in this system and is charged by current from the main generator and supplies current to the work-circuit when the car is not in motion or is running so slowly that the generator does not produce the desired voltage. In order that this system should work satisfactorily under all circumstances, it is, however, necessary that the iron forming the magnetic circuits of the main generator and the motor should be worked well below the saturation-point throughout the working range of the system. The magnetic circuit of the main generator must therefore be of sufficient cross-section to remain well below the saturation-point when it carries the maximum field flux, which is the flux required at the lowest working speed of the main generator, and the magnetic circuit of the motor must be of sufficient cross-section to remain well below the saturation-point when it carries the maximum flux, which occurs at the lowest speed of the motor corresponding to the highest working speed of the generator. These considerations require the weight and size of these machines to be made much greater than the output of the apparatus would appear to warrant.

One object of this invention is to improve this self-regulating system of distribution with a view of producing the desired regulating effect for a given output by smaller and lighter machines and over a greatly-wider range of speed variations.

Another object of the invention is to automatically reduce the generator output during the progress of the charge of the battery for preventing waste of energy and needless evaporation of the electrolyte after the battery has attained the charged condition.

The accompanying drawing illustrates diagrammatically an electrical system of distribution embodying the invention as applied, for example, to a railroad-car-lighting system.

A represents the main generator, the armature of which is driven at varying speeds and may at times be driven in opposite directions, as is the case when the generator is driven from a car-axle, B the incandescent lamps or other translating devices connected across the work-circuit $b\ b'$, and B' the storage battery, connected across the generator-circuit.

C represents the auxiliary dynamo, whose armature is subject to the same variations in speed and direction as that of the main generator. This auxiliary dynamo may have its armature mounted on the same shaft $a$ upon which the armature of the main generator is mounted and which is rotated from the car-axle by a belt $a'$ and pulley $a^2$ or other suitable means.

D represents the motor, and E the exciter-dynamo, whose armature is driven by the motor and which excites the field-magnet of the main generator. The field-windings of the motor D are connected across the brushes of the auxiliary dynamo C by conductors $c$ $c'$ and are energized by the current produced by said dynamo. The field-windings of the exciter-dynamo E and the armature of the motor D are supplied from a source of practically-constant electromotive force—for instance, the work-circuit, as shown in the drawings—while the field-windings $c^2$ of the auxiliary dynamo C may be fed either from a constant source, such as the work-circuit, or preferably directly from the battery, in which case they are subjected to the variable voltage of the battery as determined by its condition of charge. In order that these windings may be connected at desire across either of said sources, a suitable switch is provided—for instance, a two-point switch $c^3$—one contact, $c^4$, of which connects through the conductor $c^5$ to the work-circuit, while the other contact, $c^6$, connects through the conductor $c^7$ to the battery. The field-magnet of the exciter-dynamo E has a winding E', which is connected in shunt across the work-circuit, as by the conductors $c^5$ $e$. In addition to this shunt field-winding E', which is disclosed in my said patent, the exciter-dynamo has another or supplemental field-winding $E^2$, which acts cumulatively with the shunt-winding E' and is connected in series with the armature of the motor D across the work-circuit, as by the conductors $c^5$, $e'$, and $e$. These field-windings and the armature of the motor can be connected to any other practically-constant source, while similarly the field-windings of the auxiliary dynamo may connect with other sources of constant or variable voltage with like results.

F represents the automatic switch described in said patent for connecting the armature of the motor D in circuit when the train and the main generator attain a predetermined speed. G represents an automatic switch for similarly connecting the main generator into the battery and work circuit when a predetermined electromotive force across the main generator is produced. The operating-magnet of this switch G has a winding $g$, which is connected in shunt across the main-generator brushes and acts initially to close the circuit, and a second winding $g'$ in series with the generator-circuit. This series winding acts cumulatively with the shunt-winding $g$ to retain the switch closed until the electromotive force of the main generator falls below that of the battery, when the latter will discharge into the main generator through the series winding $g'$, which will then act differentially to the shunt-winding $g$, and in thus demagnetizing the core of the switch-magnet will cause it to open the generator-circuit.

H represents conventionally any known or suitable automatic means for maintaining a constant electromotive force across the work-circuit. The means illustrated consists of a resistance device or rheostat having an arm $h$, which is actuated by any suitable electromechanical device $h'$. Counter-electromotive-force cells can be substituted for the resistance to effect the regulation, as explained in my application for United States Letters Patent filed October 30, 1903, Serial No. 179,145.

In practice it will be possible to work the magnetic circuit of the main generator and its exciter-dynamo E nearly up to the saturation-point at the lowest speed at which it is desired to generate current—say at a car speed of fifteen miles per hour in train-lighting work. The magnetic circuit of the motor D will be unsaturated at this speed, but may work up toward the saturation-point at a high train speed—say about eighty-five miles per hour. By this method the minimum cross-section, and consequently minimum weight of iron, is utilized for a maximum magnetic flux, while with a minimum flux the field will be sufficiently stable for effective commutation. The magnetic circuit of the auxiliary dynamo C would be worked so far below the saturation-point that a rise of about twenty-five per cent. in the battery electromotive force above its normal floating electromotive force will be accompanied by a practically similar increase in field flux, and consequently a proportionate rise in electromotive force across the brushes of the auxiliary dynamo.

The operation of the system is as follows: When the armatures of the main generator and auxiliary dynamo are set in motion, the current generated by the auxiliary dynamo as the fields of the latter are energized from some practically-constant source will vary directly as the speed of rotation. This current energizes the field-magnets of the motor and also the solenoid of the motor-starting switch, and when the current reaches a sufficient value, due to a sufficient speed of the armature of the auxiliary dynamo, the solenoid of the switch F will attract its core and cut into circuit the motor-armature and also the two field-windings E' $E^2$ of the exciter-dynamo E. The magnetic circuit of the exciter-dynamo is thus energized by the joint and cumulative effect of the shunt-winding E', which is traversed by a practically-constant current, and the supplemental or series winding $E^2$, which is traversed by the variable current of the motor-armature. The motor-starting switch is adjusted to act when the car has attained a predetermined slow speed, at which time the electromotive force of the auxiliary dynamo will be of correspondingly low value, and as this low electromotive force is impressed across the field-winding of the motor the latter and the exciter-dynamo driven thereby will revolve at the maximum speed, and the exciter-dynamo will excite the field-winding of the main generator to its maximum value. The reason for this is twofold, for not only is the armature of the exciter-dynamo revolving at this point at its maximum speed, but it is also revolving in a field of maximum strength. The combined effects of these factors result in impressing a maximum electromotive force across the field of the main generator. The field of the exciter-dynamo is of maximum strength at this time, because the current through the motor-armature rises in proportion to the force which tends to retard its motion, and as the exciter-dynamo in furnishing its maximum current to the main-generator fields applies a maximum braking or retarding effect to the motor-armature it follows that the current through the latter, particularly with its weak field, will be at a maximum value. This high current traversing the supplemental or series winding $E^2$ of the exciter-dynamo, added to the current of constant value which flows through the shunt-winding $E'$, furnishes the maximum excitation for the exciter-dynamo and a corresponding maximum current for exciting the main generator. This powerful excitation of the main-generator field causes the generator to furnish its full output at the lowest train speed for which the system is adjusted. As the speed of the main generator and auxiliary dynamo rises the speed of the exciter-dynamo falls, on account of the increasing excitation of the motor-field, and the excitation of the exciter-dynamo decreases by reason of the accompanying reduction of current through the motor-armature and the exciter series winding. These combined effects therefore result in a reduction of the main-generator excitation in greater proportion than the speed increase of the generator, while when the speed of the generator decreases the excitation of the generator-field increases at a greater ratio than the decrease of speed alone would produce, because the current furnished to the generator-field by the exciter-dynamo increases not only by the increased speed imparted to the exciter-dynamo by the motor, but also by the increased excitation of the field of the exciter-dynamo resulting from the increased current furnished through the motor-armature to the supplemental field-winding of the exciter-dynamo as the speed of the exciter-dynamo increases. I find by actual test that the regulating effect of the exciter apparatus so constructed is such as to compensate for the varying magnetic reluctances, due to the widely-varying magnetic densities in the iron forming the magnetic circuits, up to the effective limit of saturation. When the electromotive force increases sufficiently to charge the battery, the shunt-winding of the solenoid of the automatic switch G will be energized to an extent to attract its core and close the generator-circuit, after which the generator-current flowing through the series winding of said switch-solenoid will augment the magnetization imparted by the shunt-winding and forcibly hold the switch in closed position until the conditions of speed or excitation are such that the generator electromotive force falls below that of the battery, when the current from the latter discharging into the main generator through the series winding of the solenoid will cause a differential action of the latter and cause the switch to open and cut the main generator out of circuit. When the field-winding of the auxiliary dynamo is connected across the work-circuit, which is the case when the switch $c^3$ stands in the position shown in dotted lines, the main generator will tend to furnish a substantially constant strength of current to the battery. This is not desirable when the battery voltage is very high, because in that case the sending of an unnecessary current to the battery may injure the battery and in any case involves waste of energy and a needless evaporation of the electrolyte. On the other hand, when the field of the auxiliary generator is connected by the switch $c^3$ directly across the battery, as shown in full lines, this field will be subjected to the rise and fall in the electromotive force of the battery accompanying the charging and discharging processes, and the electromotive force across the auxiliary-dynamo brushes will rise and fall proportionately, which rise and fall, like the rise and fall due to speed increase and decrease, will act through the exciter apparatus to cut down or increase the excitation of the main generator, and therefore cause a variation of the output of the latter in greater proportion than the increase or decrease of battery voltage, which is an ideal condition. By this means the regulation of the generator will be such that it will furnish the necessary current to keep the battery properly charged and no more, the current decreasing as the voltage of the battery rises, while a discharge of the battery, brought about, for instance, by the lighting of lamps during a stoppage of the train, will be followed by a heavier charging rate of current from the generator when it again goes into action. This arrangement therefore prevents injury to the battery, waste of energy, and needless evaporation of the electrolyte when the battery has reached the charged condition.

While the system is herein described as applicable especially to a car-lighting system which requires generator regulation against excessive speed variations, it will be understood that the system is not limited to such application and also that the battery is not an essential adjunct as far as the general system of regulation is concerned.

I claim as my invention—